Figure 1:
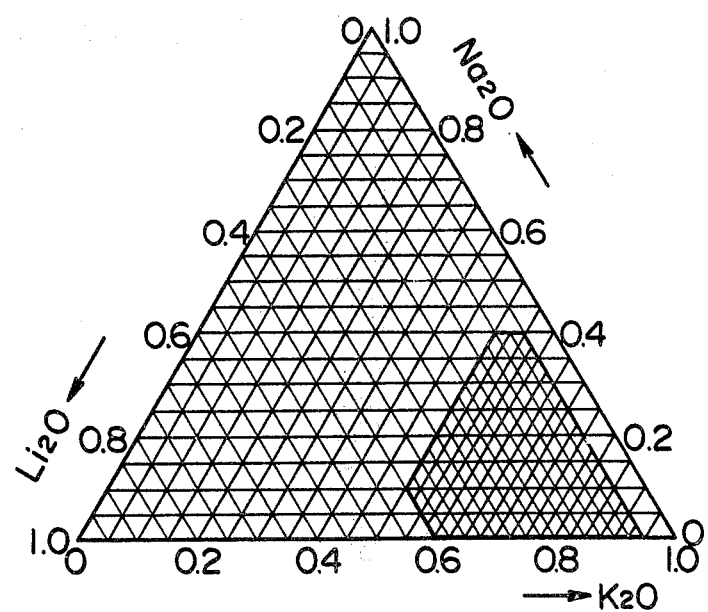

United States Patent [19]

Kume

[11] 3,923,528

[45] Dec. 2, 1975

[54] GLASS-CERAMIC ARTICLES
[75] Inventor: Makoto Kume, Itami, Japan
[73] Assignee: Nippon Sheet Glass Co., Ltd., Osaka, Japan
[22] Filed: Mar. 22, 1974
[21] Appl. No.: 453,996

[30] Foreign Application Priority Data
Mar. 22, 1973  Japan.............................. 48-33300

[52] U.S. Cl.................................... 106/52; 106/54
[51] Int. Cl.²........................ C03C 3/04; C03C 3/08
[58] Field of Search...................... 106/39.7, 54, 52

[56] References Cited
UNITED STATES PATENTS
3,170,780  2/1965  Takehara et al.................. 106/39.7
3,673,049  6/1972  Giffen................................ 106/39.7
3,709,705  1/1973  Hagedorn........................... 106/54

*Primary Examiner*—Winston A. Douglas
*Assistant Examiner*—William G. Wright
*Attorney, Agent, or Firm*—Wenderoth, Lind & Ponack

[57] ABSTRACT

A glass-ceramic article, obtained by melting a glass composition comprising, on the weight percent basis, 54–68% $SiO_2$, 5–13% $Al_2O_3$, 0–11% MgO, 8–28% CaO, the sum of the proportions of MgO and CaO being 18–28%, 2–8% $B_2O_3$, 0.1–2.5% ZnO, 0.05–0.3% sulfide sulfur, and 3–10% $R_2O$, $R_2O$ being a combination of at least two of $Li_2O$, $Na_2O$ and $K_2O$, the mol ratio of $LiO_2/R_2O$ being 0.05–0.4, the mol ratio of $Na_2O/R_2O$ being 0–0.4, and the mol ratio of $K_2O/R_2O$ being 0.5–0.95, the total of these components being at least 95% by weight, forming the molten glass into the desired shape, and heat-treating it.

4 Claims, 1 Drawing Figure

GLASS-CERAMIC ARTICLES

This invention relates to glass-ceramic articles containing zinc sulfide as a crystal nucleating agent which have reduced deformation during a crystallization heat-treatment and have a relatively low crystallization temperature.

Glass-ceramic articles of various types have previously been proposed, but all of them have one or more defects that make them unsatisfactory. For example, a certain glass-ceramic article suffers from a considerably large deformation because the viscosity of the glass during a crystallization heat-treatment is low, and also has the defect that the heat-treatment should be performed for prolonged periods of time at relatively high temperatures. Another type of glass-ceramic articles has the defect that a great quantity of fluorine is used to cause the evolution of noxious gases during manufacture, although its deformation is reduced and it can be continuously rolled on a conveyor. Still another type of glass-ceramic articles suffers from the disadvantage that the raw glass batch should contain a relatively large quantity of sulfide sulfur, and therefore should be maintained in a strongly reduced condition, in which case a large quantity of scum is generated, and zinc is reduced to a metallic state to prevent the crystallization of the glass.

It is an object of this invention to provide novel glass-ceramic articles of excellent performance which are free from all the defects of the conventional glass-ceramic articles. The glass-ceramic articles of the invention have the following advantages.

1. The glass-ceramic articles can be continuously rolled on a conveyor, or continuously pressed by a press.
2. The glass-ceramic articles can be produced at lower crystallization temperatures and for shorter periods of crystallization treatment.
3. The glass-ceramic articles do not contain fluorine.
4. Scum is scarcely generated, and the melting of glass is easy.

According to this invention, there is provided a glass-ceramic article, obtained by melting a glass composition comprising, on the weight percent basis, 54–68 % $SiO_2$, 5–13 % $Al_2O_3$, 0–11 % MgO, 8–28 % CaO, the sum of the proportions of MgO and CaO being 18–28 %, 2–8 % $B_2O_3$, 0.1–2.5 % ZnO, 0.05–0.3 % sulfide sulfur, and 3–10 % $R_2O$, $R_2O$ being a combination of at least two of $Li_2O$, $Na_2O$ and $K_2O$, the mol ratio of $LiO_2/R_2O$ being 0.05–0.4, the mol ratio of $Na_2O/R_2O$ being 0–0.4, and the mol ratio of $K_2O/R_2O$ being 0.5–0.95, the total of these components being at least 95 % by weight, forming the molten glass into the desired shape, and heat-treating it.

The glass-ceramic article of this invention contains $SiO_2$, $Al_2O_3$, MgO, CaO, $B_2O_3$, ZnD, S (sulfide sulfur), $Li_2O$, $Na_2O$ and $K_2O$ in the weight percents specified above. The total proportions of these components are at least 95 % by weight. In addition to these components, not more than 5 % by weight in total of components which do not substantially affect the properties of the glass-ceramic article of the present invention (for example, BaO, SrO, $P_2O_5$, $TiO_2$, FeO, or MnO) can be incorporated into the glass composition. It is preferred however that the total amount of these optional components should be not more than 2 % by weight.

One important feature of the glass-ceramic article of this invention is that it contains specified proportions of $B_2O_3$ and $K_2O$ as essential ingredients. We have found that the presence of $B_2O_3$ and $K_2O$ contributes to the remarkable promotion of the crystallization of the glass composition because of a synergestic effect of these two components, and that the apparent viscosity of the glass in a crystallization heat-treatment temperature range increases remarkably, and the crystallization heat-treatment time is markedly shortened, with the result that the deformation of the glass-ceramic article is very much reduced. It has previously been known that $K_2O$ has the effect of preventing the deformation of glass by crystallization heat-treatment, but it has been quite unknown that a combination of it with $B_2O_3$ gives a greater effect of preventing deformation than in the case of using $K_2O$ alone.

The composition of the glass-ceramic article of this invention will first be described below.

The proportion of $SiO_2$ is specified as 54 to 68 % by weight. If it is less than 54 % by weight, the deformation of the glass by the crystallization heat-treatment is accelerated, and when it is above 68 %, the melting temperature of the glass batch and the forming temperature of the glass batch become higher, and crystallization by heat-treatment becomes difficult.

The proportion of $Al_2O_3$ is specified as 5 to 13 % by weight. If it is less than 5 %, the glass tends to be devitrified, and a crystallized article of good quality cannot be obtained. It is is above 13 %, it is difficult to melt the glass batch, and the crystallization temperature becomes high to cause a greater deformation.

MgO is not an essential ingredient, but since it produces an effect of preventing devitrification and of increasing acid resistance, the presence of MgO is preferred. In order to prevent devitrification. It is sufficient that MgO is present in an amount of not more than 3.5 %. In order to increase the acid resistance of the glass-ceramic article, it is generally necessary to incorporate MgO in a larger amount. The presence of MgO in a proportion of up to 11 % by weight gives rise to an increase in acid resistance, but the acid resistance does not increase further even if MgO is present in an amount beyond 11 % by weight, but rather it impairs the appearance of the resulting glass-ceramic article. Accordingly, the proportion of MgO should be limited to not more than 11 % by weight. The preferred range of the proportion of MgO is 0 to 3.5 % by weight.

The proportion of CaO is specified as 8–28 % by weight, and the sum of the proportions of CaO and MgO is limited to 18–28 % by weight. This is because the glass batch becomes difficult to crystallize when the proportion of CaO is less than the lower limit of the above-specified range, and the glass batch tends to be devitrified and cannot be fabricated in a stable condition when the proportion exceeds the upper limit. The preferred range of the content of CaO is 15 to 28 % by weight.

As stated hereinabove, $B_2O_3$ has been found to act uniquely on the crystallization of the glass composition, when used conjointly with $K_2O$. When $B_2O_3$ is used together with $K_2O$, heat-treatment for the formation of a nucleus becomes totally unnecessary. Electron-microscopic examination shows that glass containing $B_2O_3$ has a remarkable domain structure. On the other hand, glass free from $B_2O_3$ has only a relatively homogeneous structure. The glass not containing $B_2O_3$ attains the structure of untreated glass containing $B_2O_3$ only after being maintained for several hours at a temperature of about 700°C. This fact means that the presence of $B_2O_3$ leads to the remarkable promotion of crystallization, and to the remarkable shortening of the overall crystallization heat-treating time and the lowering of the crystallization temperature, and consequently, the deformation of the glass is reduced. However, if the proportion of $B_2O_3$ is less than 2 % by weight, the crystallization of the glass is not sufficiently promoted, and the crystallization temperature becomes high. Furthermore, the crystallization of the glass is insufficient, the deformation of the glass becomes great, and cracks are formed in the resulting crystallized product, which in turn causes a reduction in the strength of the product. If the proportion of $B_2O_3$ is more than 8 % by weight, the above crystallization promoting effect no longer increases, but rather, cracks are likely to occur.

In addition to the crystallization promoting effect described above, the presence of $B_2O_3$ further produces an effect of remarkably decreasing the devitrification temperature, promoting the melting of the batch, and increasing the homogeneity of the glass.

ZnO and sulfide sulfur change to zinc sulfide in the glass, and are effective as a crystal nucleating agent. If the ZnO content is not more than 0.1 % by weight, the glass is difficult to crystallize, and if it is larger than 2.5 % by weight, the deformation of the glass-ceramic article increases. Therefore, the content of ZnO is limited to 0.1 to 2.5 % by weight. The required amount of sulfur (sulfur as sulfide) is generally proportional to the proportion of ZnO (thus, if ZnO increases, S increases), but if it is not more than 0.05 % by weight, the crystallization temperature becomes high, and the deformation of the glass increases. On the other hand, even if it exceeds 0.3 % by weight, its effect as a crystal nucleating agent does not increase, but rather it causes the disadvantage that the glass melt should be maintained in a more reducing atmosphere. Accordingly, the amount of scum increases markedly to render the operation difficult, and also there is a likelihood that ZnO will be reduced to metallic Zinc. The formation of metallic zinc causes the decrease of zinc sulfide as a nucleating agent and therefore, the inhibition of the crystallization of the glass. The preferred proportion of sulfide sulfur is 0.08 to 0.15 % by weight, and within this range, the melting operation can be performed without hardly generating the scum.

The proportion of $R_2O$ is specified as 3 to 10 % by weight. If it is less than 3 % by weight, it is difficult to melt the batch homogeneously, and the crystallization temperature becomes higher to cause a larger deformation of the glass-ceramic article. If it exceeds 10 % by weight, the crystallization is insufficient to cause a greater deformation of the glass-ceramic article.

$R_2O$ represents alkali metal oxides selected from $Li_2O$, $Na_2O$ and $K_2O$. The mol ratio of $Li_2O/R_2O$ is 0.05 to 0.4; the mol ratio of $Na_2O/R_2O$ is 0 to 0.4; and the mol ratio of $K_2O/R_2O$ is 0.5 to 0.95. These specified mol ratios make it possible to obtain glass-ceramic articles of extremely reduced deformation as compared with the conventional articles through crystallization at lower crystallization temperatures and for shorter crystallization periods.

The extent of deformation is determined by the apparent viscosity of the glass in the crystallization heat-treatment temperature range and the crystallization heat-treatment time, and becomes smaller with higher viscosities of the glass and shorter periods of the crystallization heat-treatment.

The crystallization temperature becomes lowest when the mol ratio of $Li_2O:Na_2O:K_2O$ is about 1:0:1. This composition is therefore best when considering the crystallization temperature alone, but with this composition, the viscosity of the glass is too low. When the mol ratios of $K_2O$ in the alkali metal oxides increases in the above composition, the viscosity of the glass increases, and when the mol ratio of $Li_2O$ increases, the viscosity decreases. The effect of $Na_2O$ on the viscosity of glass is between those of $Li_2O$ and $K_2O$. Accordingly, it is not preferred to increase the proportion of $LiO_2$ too much. If the proportion of $LiO_2$ increases, non-uniform turbidity occurs in the product, and cracks sometimes occur to reduce the strength of the glass article. However, the incorporation of a relatively small amount of $Li_2O$ promotes the crystallization of the glass remarkably, and permits the crystallization heat-treatment of the glass at lower temperatures than in the past.

It has consequently been found that the mol ratio of $Li_2O/R_2O$ is preferably 0.05 to 0.4.

$Na_2O$ is not an essential component. If, however, a glass material such as feldspar or blast furnace slag is used, $Na_2O$ is inevitably contained in the glass. Furthermore, even if a small amount of $Na_2O$ is contained, it does not impair the deformation preventing effect brought about by the heat-treatment in the present invention, but makes it easier to melt the glass. But if the amount of $Na_2O$ is large, the viscosity of the glass in the heat-treatment temperature range becomes too low, and the deformation becomes greater.

By an overall consideration of the above points, it has been found that the mol ratio of $Na_2O/R_2O$ is advantageously 0 to 0.4. As already stated, $K_2O$, in combination with $B_2O_3$, markedly reduces the deformation of the glass-ceramic article, and therefore is an essential component of the glass-ceramic article of this invention.

The mol ratios of the alkali metal oxides in the glass-ceramic article of this invention are shown in FIG. 1 by an area surrounded by a solid line.

EXAMPLE 1

3 Kg (as glass) of a glass bath having each of the compositions shown in Table 1 was charged into a crucible made of clay, and melted in an electric furnace at 1350° to 1450°C. for 7 hours. In this case, the materials were chosen properly from silica sand, feldspar powder, dolomite, limestone, blast furnace slag, calcium borate, lithium carbonate, sodium carbonate, potassium carbonate, zinc sulfide, zinc oxide, and carbon, etc.

The molten glass batch was withdrawn from the furnace, and poured onto an iron plate to form a flat plate. Rectangular plates 100 mm long, 15 mm wide and 5–8 mm thick were cut out from this flat plate, and heat-treated in accordance with the heat-treatment schedule shown in Table 2. The viscosity of the glass during the heat-treatment was measured by a beam bending viscosity measuring device. The minimum viscosities of the glass during the heat-treatment step are shown.

In Table 1, the indication of impurities (e.g., FeO, $TiO_2$, MnO) usually present in an amount of below about 1 % in total is omitted. In Table 1, Runs Nos. 3 to 18 cover the compositions of the glass-ceramic article of this invention. Run No. 1 covers the glass containing only $Na_2O$ as an alkali metal oxide, and Run No. 2 shows the glass not containing $B_2O_3$. Therefore, Runs 1 and 2 are comparisons falling outside the scope of the present invention.

Table I

| Run No. | 1 | 2 | 3 | 4 | 5 | 6 | 7 | 8 | 9 |
|---|---|---|---|---|---|---|---|---|---|
| Components (wt %) | | | | | | | | | |
| $SiO_2$ | 59.8 | 61.0 | 58.0 | 65.0 | 60.2 | 57.4 | 61.0 | 59.8 | 59.0 |
| $Al_2O_3$ | 6.0 | 6.1 | 5.9 | 6.0 | 6.1 | 5.8 | 6.0 | 5.9 | 8.0 |
| MgO | 1.5 | 1.6 | 1.5 | 1.3 | 1.5 | 1.4 | 3.3 | 1.6 | 1.7 |
| CaO | 22.2 | 22.7 | 21.8 | 20.8 | 22.4 | 21.3 | 18.0 | 21.3 | 21.3 |
| ZnO | 0.50 | 0.50 | 0.50 | 0.20 | 0.50 | 0.50 | 0.60 | 2.00 | 0.45 |
| $B_2O_3$ | 3.8 | 0 | 3.7 | 2.5 | 3.9 | 6.0 | 4.5 | 3.0 | 3.0 |
| Sulfide sulfur | 0.10 | 0.10 | 0.09 | 0.10 | 0.12 | 0.12 | 0.13 | 0.24 | 0.15 |
| $Li_2O$ | 0 | 0.3 | 0.3 | 0.2 | 0.3 | 0.3 | 0.4 | 0.2 | 0.8 |
| $Na_2O$ | 6.0 | 0.7 | 0.7 | 0.9 | 0.4 | 0.6 | 0.1 | 0.4 | 0.3 |
| $K_2O$ | 0 | 7.0 | 6.7 | 3.0 | 4.5 | 6.6 | 6.0 | 5.5 | 5.3 |
| $R_2O$ | 6.0 | 8.0 | 7.7 | 4.1 | 5.2 | 7.5 | 6.5 | 6.2 | 6.4 |

| Run No. | 10 | 11 | 12 | 13 | 14 | 15 | 16 | 17 | 18 |
|---|---|---|---|---|---|---|---|---|---|
| $SiO_2$ | 59.7 | 58.5 | 59.1 | 59.0 | 57.3 | 56.7 | 55.8 | 62.7 | 64.1 |
| $Al_2O_3$ | 5.8 | 6.0 | 5.9 | 5.9 | 7.9 | 9.7 | 11.4 | 6.3 | 6.2 |
| MgO | 1.4 | 0.5 | 1.5 | 1.5 | 1.5 | 1.5 | 1.4 | 9.2 | 11.0 |
| CaO | 22.3 | 25.5 | 21.9 | 21.9 | 21.4 | 21.0 | 20.7 | 12.7 | 8.8 |
| ZnO | 0.43 | 0.50 | 0.50 | 0.49 | 0.50 | 0.50 | 0.50 | 0.50 | 0.50 |
| $B_2O_3$ | 3.9 | 3.5 | 3.8 | 3.8 | 3.7 | 3.6 | 3.5 | 3.0 | 4.3 |
| Sulfide sulfur | 0.07 | 0.10 | 0.16 | 0.13 | 0.1 | 0.1 | 0.1 | 0.15 | 0.12 |
| $Li_2O$ | 0.2 | 0.3 | 0.3 | 0.7 | 0.3 | 0.3 | 0.3 | 0.25 | 0.20 |
| $Na_2O$ | 0.1 | 0.4 | 0.7 | 0 | 0.7 | 0.6 | 0.5 | 0.50 | 0.20 |
| $K_2O$ | 6.1 | 4.7 | 6.1 | 6.6 | 6.6 | 6.0 | 5.8 | 4.70 | 4.60 |
| $R_2O$ | 6.4 | 5.4 | 7.1 | 7.3 | 7.6 | 6.9 | 6.2 | 5.45 | 5.00 |

| Run No. | 1 | 2 | 3 | 4 | 5 | 6 | 7 | 8 | 9 |
|---|---|---|---|---|---|---|---|---|---|
| Mol Ratio | | | | | | | | | |
| $Li_2O/R_2O$ | 0 | 0.11 | 0.11 | 0.13 | 0.15 | 0.11 | 0.17 | 0.09 | 0.30 |
| $Na_2O/R_2O$ | 1.0 | 0.12 | 0.12 | 0.27 | 0.10 | 0.11 | 0.02 | 0.09 | 0.05 |
| $K_2O/R_2O$ | 0 | 0.77 | 0.77 | 0.60 | 0.75 | 0.78 | 0.81 | 0.82 | 0.65 |

| Run No. | 10 | 11 | 12 | 13 | 14 | 15 | 16 | 17 | 18 |
|---|---|---|---|---|---|---|---|---|---|
| $Li_2O/R_2O$ | 0.09 | 0.15 | 0.12 | 0.25 | 0.11 | 0.12 | 0.13 | 0.13 | 0.11 |
| $Na_2O/R_2O$ | 0.02 | 0.10 | 0.13 | 0 | 0.12 | 0.12 | 0.10 | 0.12 | 0.05 |
| $K_2O/R_2O$ | 0.89 | 0.75 | 0.75 | 0.75 | 0.77 | 0.76 | 0.77 | 0.75 | 0.84 |

Table 2

| | Temperature raising | | Temperature maintenance | Annealing |
|---|---|---|---|---|
| A | Heated to 650°C. at 10°C./min. | Heated from 650°C. to 950°C. at 1°C./min. | Maintained at 950°C. for 60 minutes | Furnace cooling |
| B | Heated to 750°C. at 10°C./min. | Heated from 750°C. to 780°C. at 1°C./min. | Heated from 780°C. to 890°C. at 10°C./min. | Maintained at 890°C. for 10 minutes | Furnace cooling |
| C | Heated to 740°C. at 10°C./min. | Heated from 740°C. to 760°C. at 15°C./min. | Heated from 760°C. to 850°C. at 7.5°C./min. | Maintained at 850°C. for 8 minutes | Furnace cooling |
| D | Heated to 750°C. at 10°C./min. | Heated from 750°C. to 950°C. at 5°C./min. | Maintained a6 950°C. for 5 minutes | Furnace cooling |

Table 3

| Run No. | Heat-treatment schedule | Minimum viscosity (log poises) | Remarks |
|---|---|---|---|
| 1 | A | 7.5 | (about 80 % crystallized) |
| 1 | C | Not measured | (not crystallized) |
| 2 | B | 8.7 | (crystallization insufficient, cracks occurred) |
| 3 | B | 9.5 | |
| 4 | B | 9.7 | |
| 5 | C | 9.6 | |
| 6 | C | 9.9 | |
| 7 | B | 9.8 | |
| 8 | B | 9.7 | |
| 9 | B | 9.9 | |
| 10 | B | 9.7 | |
| 11 | B | 9.8 | |
| 12 | C | 9.8 | |
| 13 | C | 9.8 | |
| 14 | B | 10.0 | |

Table 3-continued

| Run No. | Heat-treatment schedule | Minimum viscosity (log poises) | Remarks |
|---|---|---|---|
| 15 | B | 10.3 | |
| 16 | B | 9.7 | |
| 17 | D | 10.2 | |
| 18 | D | 10.5 | |

X-ray diffraction analysis showed that in the samples used in Runs Nos. 3 to 18, the amount of crystals precipitated was at least 80 % of the theoretical amount. A comparison of Run No. 2 with Run No. 3 clearly demonstrates the synergestic effect of the presence of both $B_2O_3$ and $K_2O$. When the heat-treatment is carried out in accordance with the schedule B in Table 2, Run No. 3 presents white glass-ceramic articles of good quality, while the glass composition of Run No. 2 which does not contain $B_2O_3$, when heat-treated in accordance with the schedule B, presents a substantially glassy appearance of an amber color and develops cracks everywhere. By employing the composition of the glass as specified in the present invention, the minimum viscosity increases to $10^{9.5}$ to $10^{10.5}$, and accordingly, the deformation of the glass is extremely reduced. Moreover, the crystallization temperature is lowered, and the treating time can be drastically shortened.

The heat-treating schedule shown in Table 2 is a mere illustration, and does not in any way limit the present invention. For example, in schedule B, C or D, it is possible to place the glass directly in a furnace maintained at 750° to 740°C., and then heat-treat it in accordance with the above schedule. In this case, too, the deformation is very small. Furthermore, in the above schedule, the sample can be rapidly cooled, for example, with an air jet stream, after having been maintained at 890°C., 850°C., or 950°C., for 10, 8, or 5 minutes, respectively, In this case, the strength of the product increases to about 2 times or more, and the overall treating time can be drastically shortened.

The glass-ceramic article obtained by the present invention has the following properties.
Bending strength: about 1000 Kg/cm²
Impact strength (JIS* A 5410 – 1967): 0.7 to 1.5 Kg.m
Specific gravity: 2.6 to 2.7
Knoop hardness: 570 to 650 Kg/mm²
Coefficient of thermal expansion: $(60-80) \times 10^{-7}$ (cm/cm°C.)
Acid resistance (JIS* R 1503 – 1955): 0.1–1.3 %
*JIS stands for Japanese Industrial Standards.

As described above, the glass-ceramic articles of this invention have reduced deformation during heat-treatment, and the crystallization can be performed at a relatively low temperature of 800° to 900°C. The desired glass-ceramic articles can be obtained within shorten periods of time. The reduced deformation affords the advantage of giving products of very good dimensional precision. The glass can be obtained easily in white color, and since it does not contain a fluoride, there is hardly any evolution of noxious gases during its manufacture as is the case with the conventional glasses of this kind. Furthermore, scum is hardly formed during melting, and the operation can be performed stably.

What is claimed is:

1. A glass-ceramic article consisting essentially of, on a weight percent basis, 54–68% $SiO_2$, 5–13% $Al_2O_3$, 0–11% MgO, 8–28% CaO, the sum of the proportions of MgO and CaO being 18–28%, 2–8% $B_2O_3$, 0.1–2.5% ZnO, 0.05–0.3% sulfide sulfur, and 3–10% $R_2O$, $R_2O$ being a combination of at least two of $Li_2O$, $Na_2O$, and $K_2O$, the mol ratio of $Li_2O/R_2O$ being 0.05–0.4, the mol ratio of $Na_2O/R_2O$ being 0–0.4, and the mol ratio of $K_2O/R_2O$ being 0.5–0.95, the total of these components being at least 95% by weight, said composition being devoid of fluorine therein.

2. The glass-ceramic article of claim 1 wherein the proportion of CaO is 15 to 28 % by weight.

3. The glass-ceramic article of claim 1 wherein the proportion of MgO is 0 to 3.5 % by weight.

4. The glass-ceramic article of claim 1 wherein the proportion of sulfide sulfur is 0.08 to 0.15 %.

* * * * *